United States Patent [19]

Yoshiharu et al.

[11] 4,357,615
[45] Nov. 2, 1982

[54] CLEANING CARD FOR TIME RECORDER

[75] Inventors: Kuwabara Yoshiharu; Azuma Kazushi, both of Yokohama, Japan

[73] Assignee: Amano Corporation, Yokohama, Japan

[21] Appl. No.: 233,078

[22] Filed: Feb. 9, 1981

[30] Foreign Application Priority Data

Feb. 8, 1980 [JP] Japan .................. 55-14164[U]

[51] Int. Cl.³ .................. G01D 15/24; A47L 1/00
[52] U.S. Cl. .................. 346/134; 15/210 R; 15/250.36
[58] Field of Search .................. 346/134, 146, 82–86, 346/135.1, 136, 137, 138; 15/210 R, 223, 224, 250, 250.36, 160

[56] References Cited

U.S. PATENT DOCUMENTS

| 1,851,811 | 3/1932 | Christie | 15/210 R X |
| 3,740,759 | 6/1973 | McKeegan et al. | 346/134 X |
| 4,065,798 | 12/1977 | Sugisaki et al. | 15/210 R X |

Primary Examiner—G. Z. Rubinson
Assistant Examiner—W. J. Brady
Attorney, Agent, or Firm—Wenderoth, Lind & Ponack

[57] ABSTRACT

A cleaning card particularly for a time recorder which is formed with a large number of cleaning protrusions over the front and rear surfaces thereof, said cleaning protrusions being adapted to clean the front faces of the protective glasses for both the card detecting and code reading photoelectric sending and receiving elements which are located opposite to each other on the both sides of the cars passage in the time recorder.

4 Claims, 5 Drawing Figures

CLEANING CARD FOR TIME RECORDER

BACKGROUND OF THE INVENTION

1. Field of the Invention

The present invention relates to a cleaning card particularly for a time recorder which is adapted to clean the protective glasses for both the card detecting and code reading photoelectric sending and receiving elements disposed along the card passage in the time recorder.

2. Description of the Prior Art

The conventional electronic time recorder has two functions, one of them being to perform on-off control for a motor for rotating card displacing rollers by detecting the inserting or removal of the time card into or from the card passage in the time recorder, while the other being to photoelectrically read a variety of codes in the form of punched holes which are arranged on the code columns of the time card for identifying personnel and other items. Further the time recording is provided with photoelectric sending and receiving elements which are located in an opposite location relative to the card passage to perform the above mentioned card detecting and code reading operations. On the inner walls of the card passage are formed openings through which photoelectric beams pass from the sending elements into the receiving elements, the openings each being fitted with a transparent protective glass covers respectively for the purpose of preventing the respective elements from being damaged or injured by the moving time card or having dust and other foreign materials adhered thereto.

Because of the fact that the time recorder is usually operated in such a manner that a number of personnel repeatedly insert their time card to have the predetermined printing thereon it is often recognized that the front surfaces of the protective glass pieces become contaminated with printing ink, dirty material adhered to the time card, or dust or like foreign material from the outside. It is also known that as the time recorder continues to be operated in that way, the transparency of the protective glass covers is increasingly reduced with the result that the intended card detecting and code reading cannot be performed with complete accuracy due to restrictive emission of the photoelectric beam from the sending elements and substantially decreased input into the receiving elements.

To obviate the above mentioned problem with the conventional time recorder a few measures were hitherto proposed and practiced. One of them is such that the card passage is designed in the split form so as to be simply disassembled to easily clean the front faces of the protective glass pieces every time when they become contaminated with dirty material. The other one is such that a commercial magnetic tape head cleaning plate such as a thin plastic plate with a cloth, felt or the like adhered thereon is inserted into the card passage through the card insert packet to clean the front faces of the protective glass covers.

However it is pointed out that the modified time recorder as described above has the drawbacks that the disassembled type card passage causes the time recorder to become complicated, resulting in an increased manufacturing cost, and moreover, the cleaning operation is laborious because it is necessary to open the outer cover and then disassemble the card passage prior to the cleaning operation. The latter mentioned cleaning plate also has the drawbacks that it is considerably difficult to insert the cleaning plate into the narrow card passage because it has a thickness considerably larger than that of the time card and furthermore it tends to become clogged in the card passage when inserting it by force with the result that either or both of the cleaning plate and card displacing rollers are injured or damaged.

SUMMARY OF THE INVENTION

Thus it is a principal object of the present invention to provide a cleaning card particularly for a time recorder which makes it possible to clean the front faces of the respective protective glass covers of the photoelectric sending and receiving elements in the card passage in a very simple and satisfactory manner by way of the same operations as those in case of the time card.

It is other object of the present invention to provide a cleaning card for a time recorder which ensures uniform and perfect cleaning of the protective glass covers disposed along the card passage by means of a number of protrusions which are arranged in columns at a certain inclination angle relative to the longitudinal direction in which the card is inserted into the card passage so as to prevent any occurrence of dead location where no cleaning operation is performed.

It is another object of the present invention to provide a cleaning card for a time recorder which ensures satisfactory cleaning without any possibility of injuring the front faces of the respective protective glass covers owing to the fact that the cleaning protrusions on both the front and rear surfaces of the card are designed to have sufficient resiliency and restoring force and moreover which ensures repeated cleaning of the protective glass covers by way of immediate restoration against compression by the card displacing rollers disposed along the card passage.

It is still another object of the present invention to provide a cleaning card for a time recorder which ensures cleaning operation without any possibility of injuring the front faces of the respective glass covers owing to the fact that the whole cleaning card is molded in an integral structure of paper of the same natural or synthetic fibrous material as that of the time card and which is manufactured at a very inexpensive cost though the fibrous material is ready to be impregnated with cleaning liquid such as alcohol and the like.

Other objects and advantageous features of the present invention will be readily understood by any expert of the art from the following description.

BRIEF DESCRIPTION OF THE ACCOMPANYING DRAWINGS

Now the present invention will be described in more details with reference to the accompanying drawings which illustrate a preferred embodiment of the invention, in which.

DETAILED DESCRIPTION OF THE PREFERRED EMBODIMENT OF THE INVENTION

Figure 1:
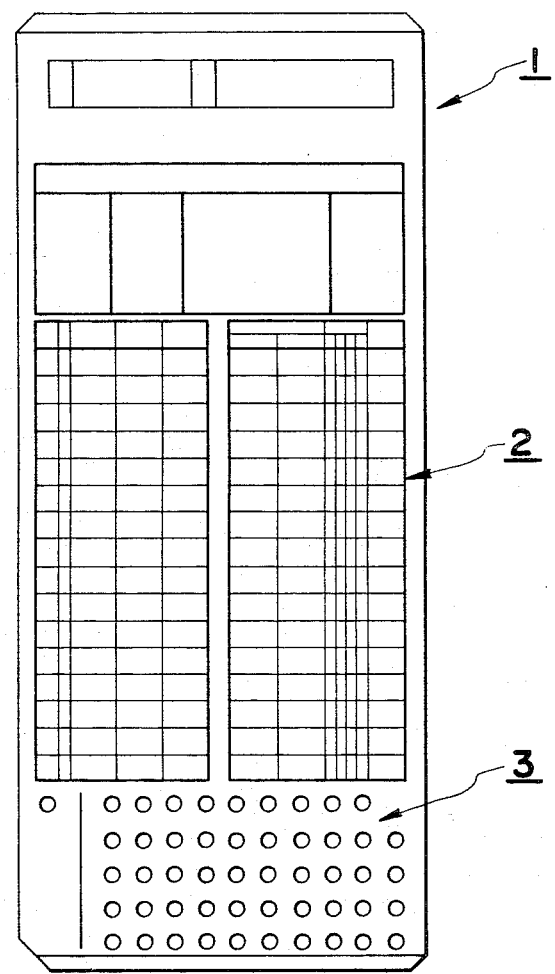
FIG. 1 is a front view of a conventional time card having a plurality of code columns arranged thereon, wherein every disignating means such as letters, numerals and the like are not shown for the purpose of simplification of illustration.

In FIG. 1 the reference numeral 1 designates a time card which comprises a printing column 2 and a code column 3, printing column 2 being intended for printing a variety of working data such as the date, working section, arrival time, leaving time, overtime and other data, while code column 3 is intended for punching holes by which a card sorting code, personnel code, irregular code and other codes are identified. As a whole the time card 1 is designed and dimensioned so as to be easily inserted into the passage in a time recorder which will be described later.

Figure 2:
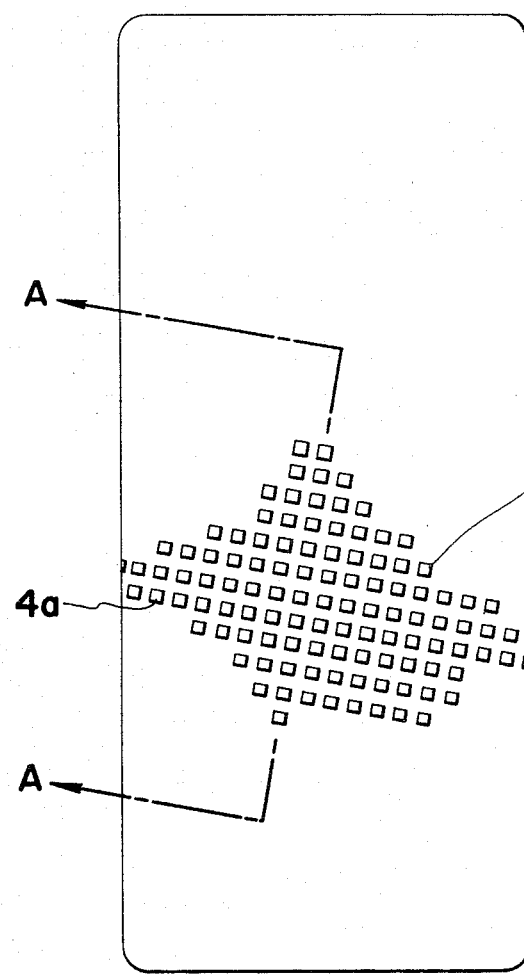
FIG. 2 is a front fiew of a cleaning card in accordance with an embodiment of the present invention, wherein the essential portion of the cleaning card is only partially illustrated.

In FIG. 2 the reference numeral 4 designates a cleaning card in accordance with the present invention. This cleaning card 4 is made of a papaer of the same natural or synthetic fibrous material as that of the aforesaid time card 1 and moreover has the same dimensions as those of the latter. Further the cleaning card 4 is formed with a large number of cleaning protrusions 4a over both the front and rear surfaces thereof, said cleaning protrusions 4a being formed by way of a suitable process such as press forming or the like. As illustrated in FIG. 2, the respective cleaning protrusions 4a are arranged in an equally spaced rows and columns, the columns extending at an inclination angle of about 10 degrees relative to the longitudinal direction of insertion of the cleaning card into the card passage (the direction in which the time card or cleaning card is inserted into the card passage of the time recorder) in order to ensure that no dead location is developed during cleaning operation. It is to be noted that in FIG. 2 the cleaning card 4 is shown to have the cleaning protrusions 4a formed partially over one of the surfaces but actually they are located over the whole front and rear surfaces.

Figure 3:
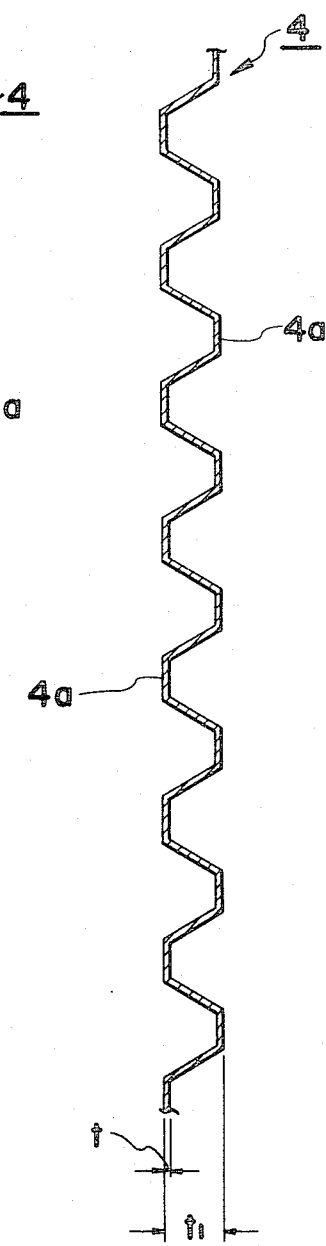
FIG. 3 is a vertical sectional view of the cleaning card taken in line A—A in FIG. 2, shown in an enlarged scale.

As described above, the cleaning protrusions 4a are arranged in an equally spaced relation in inclined alignment over both the front and rear surfaces of the card. Specifically, the respective cleaning protrusions 4a are each in the form of a truncated pyramid of which the front face has a square configuration, as shown in an enlarged scale in FIG. 3, so that they have considerable resiliency and restoring force. In FIG. 3 the reference symbol t designates the thickness of the cleaning card 4 which is dimensioned less than that of the time card 1 and further the reference symbol $t_1$ designates the whole thickness of the cleaning card 4 including that of the cleaning protrusions 4a, the whole thickness being substantially the same as the thickness of the time card 1.

Figure 4:
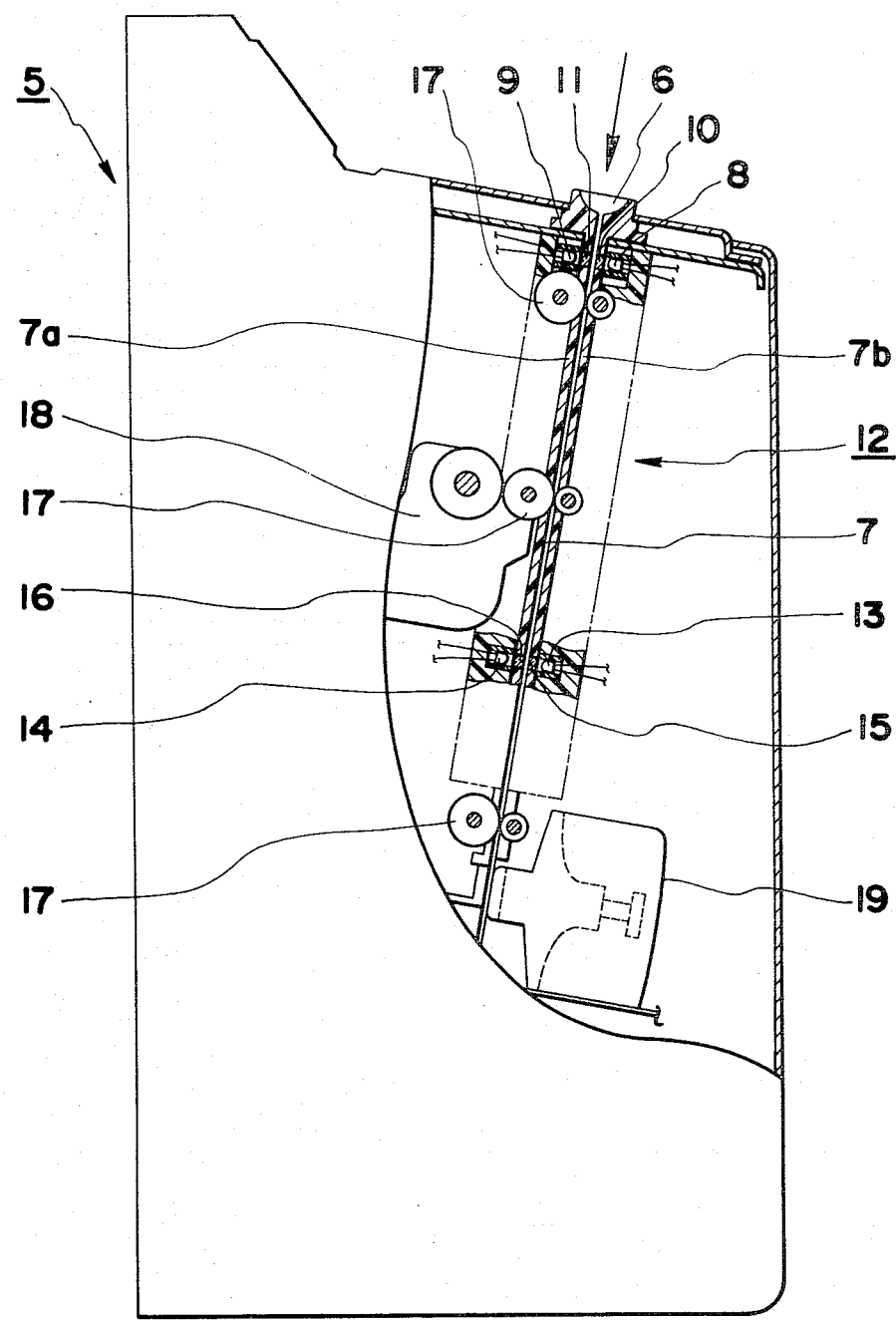
FIG. 4 is a partially sectioned side view of a time recorder through which the cleaning card is adapted to move.
Figure 5:
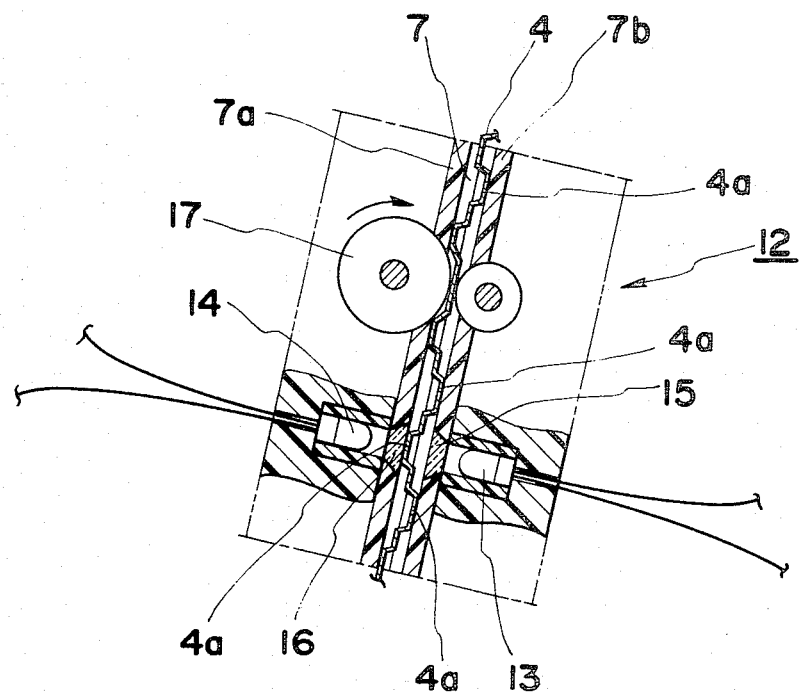
FIG. 5 is a sectional side view of the essential portion of the time recorder in FIG. 4, shown in an enlarged scale.

Now a typical time recorder in which the time card 1 as well as the cleaning card 4 are in use will be described with reference to FIGS. 4 and 5.

In the drawings the reference numeral 5 designate a housing of the time recorder, the reference numeral 6 designates a card insert pocket located on the upper surface of said housing 5 and the reference numeral 7 designates a card passage defined by means of two parallel guide plates 7a and 7b, extending through the housing 5 in the vertical direction, the upper and portion of said passage 7 being connected to the bottom opening of said card insert pocket 6. The reference numerals 8 and 9 designate photoelectric sending and receiving elements for card detecting which are located opposite to each other on the both sides of the card passage 7. Further the reference numerals 10 and 11 designate a transparent glass cover respectively which is incorporated in the photoelectric beam passage openings on the guide plates 7a and 7b, the photoelectric beam passage opening being located adjacent to both the photoelectric sending and receiving elements 8 and 9. Thus the photoelectric beam from the sending element 8 passes through the two parallel transparent glass cover 10 and 11 and then is received by the receiving element 9.

Further the reference numeral 12 typically designates a code reading detector which comprises a plurality of photoelectric sending and receiving elements 13 and 14. Sending and receiving elements 13 and 14 are protected at their front faces by means of transparent glass covers 15 and 16 in the same manner as in case of the foregoing sending and receiving elements 8 and 9 for the purpose of card detecting operation. Thus it is ensured that photoelectric beam from the sending element 13 passes through the two protective glass covers 15 and 16 and is received by the receiving element 14. It is to be noted that in the drawing just one pair of photoelectric sending and receiving elements 13 and 14 are illustrated but in practice a number of elements which are the same as those as illustrated in the drawing are arranged in alignment one above another. The reference numeral 17 designates card displacing rollers which are located in an equally spaced relation along the card passage 7, while the reference numeral 18 designates a reversible motor associated with one of the card displacing rollers 17 to drive the same. Further a printer designated by the reference numeral 19 is adapted to perform printing operation on the printing column 2 of the time card 1 which has been delivered along the card passage 7 by means of the card displacing rollers 17. The printer 19 is controlled in accordance with the codes which have been read by the code reading dectector 12.

Next, operation of the cleaning card in accordance with the present invention will be described below.

Specifically, the cleaning card is intended for cleaning the front faces of the protective glass covers 10, 11, 15 and 16 which are allocated to the card detecting and code reading photoelectric sending and receiving elements 8, 9, 13 and 14, while it proceeds upwards and downwards through the card passage 7. When it is found that the respective protective glass covers 10, 11, 15, and 16 become contaminated over their front faces due to repeated operation of the time card 1, the cleaning card 4 of the present invention is inserted into the card passage 7 through the card pocket 6 on the time recorder in the same manner as in case of the time card 1. The inserting of the cleaning card 4 is detected by means of the card detecting photoelectric sending and receiving elements 8 and 9 whereby the motor 18 starts its operation. As a result the card displacing rollers 17 become successively effective so that the cleaning card 4 proceeds downwards through the card passage 7. On completion of the full inserting of the cleaning card 4 the motor 18 is switched to reverse operation so that the card displacing rollers 17 are rotated in the opposite direction until the cleaning card 4 is restored to the original position. Then the downward and upward movements of the cleaning card 4 are repeated by the predetermined number of times in the quitely same manner as described above with the result that the prtective glass covers 10, 11, 15 and 16 allocated to the respective elements 8, 9, 13 and 14 are completely cleaned free from dirty material by way of surface contact of the cleaning protrusions 4a against the front faces of the protective glasses.

Cleaning operation of the cleaning card 4 is repeatedly performed by a certain times corresponding on the extent or thickness of contamination on the front faces of the protective glass covers. When it is found that the contamination is caused by oil or the like material, cleaning operation is performed with a cleaning card 4 which is impregnated with cleaning liquid such as alcohol or the like. Further owing to the fact that the cleaning protrusions 4a on the front and rear surfaces of the cleaning card 4 are arranged in alignment at a certain inclination angle relative to the longitudinal direction of the card, that is , the moving direction of the card, it is ensured that the protective glass covers 10, 11, 15 and 16 are uniformly cleaned without any dead location where no cleaning is effected. Furthermore owing to fact that the respective cleaning protrusions 4a are in the form of a truncated pyramid of which front face has a square configuration, they resume the original configurlation immediately after they become deformed by means of the card displacing rollers 17 as illustrated in FIG. 5 whereby complete cleaning is ensured. Thus there is no danger that the cleaning card fails to carry out the intended cleaning operation because of some damage of the cleaning protrusions 4a caused by repeated operation. Particularly the cleaning card made of paper of synthetic fiberous material is preferably acceptable, because it has an excellent restoring force. It is to noted that the cleaning card made of this type of paper is manufactured at an inexpensive cost and thus cleaning operation is performed very economically.

What is claimed is:

1. A cleaning device for cleaning by sliding surface contact therewith opposing protective transparent covers in a time recorder by insertion in longitudinal direction into a card passage sized to receive time cards of given dimensions, said protective transparent covers covering card detecting and code reading photoelectric sending and receiving elements on opposing sides of said passage, said device comprising:

a cleaning card having front and rear surfaces and having dimensions approximately equal to said given dimensions;

said card having a series of resilient cleaning protrusions on both said front surface and said rear surface, said cleaning protrusions being equally spaced in rows and columns, said columns extending at an angle of inclination to said longitudinal direction, whereby said cleaning protrusions slidingly contact and clean said covers on both of said opposing sides of said passage when said cleaning card is longitudinally inserted into said passage.

2. A cleaning card as in claim 1 wherein said resilient cleaning protrusions each have a truncated pyramid shape having a square configuration when viewed in a direction normal to said front and rear surfaces so as to have resiliency.

3. A cleaning device for cleaning by surface contact therewith opposing protective transparent covers in a time recorder by insertion in a longitudinal direction into a card passage sized to receive time cards of given dimensions, said protective transparent covers covering card detecting and code reading photoelectric sending and receiving elements on opposing sides of said passage, said device comprising:

a cleaning card having front and rear surfaces and having dimensions approximately equal to said given dimensions;

said card having a series of cleaning protrusions on both said front surface and said rear surface, said cleaning protrusions having a truncated pyramid shape having a square configuration when viewed in a direction normal to said front and rear surfaces.

4. A cleaning device as in claim 1 or claim 2 or claim 3 wherein said cleaning card is formed from a single sheet of paper in an integral structure, said cleaning protrusions being molded in said sheet of paper.

* * * * *